United States Patent
Stang, Jr.

[11] 3,773,071
[45] Nov. 20, 1973

[54] GAS REGULATOR
[75] Inventor: Charles Stang, Jr., Detroit, Mich.
[73] Assignee: Maxitrol Company, Southfield, Mich.
[22] Filed: Mar. 13, 1972
[21] Appl. No.: 234,274

[52] U.S. Cl. .............................. 137/484.8, 251/327
[51] Int. Cl. ............................................ F16k 17/34
[58] Field of Search ................... 137/484.8, 484.6, 137/505.36; 251/327, 333

[56] References Cited
UNITED STATES PATENTS
| 2,668,396 | 2/1954 | Kern, Jr. ........................ 251/327 X |
| 2,137,025 | 11/1938 | Niesemann ..................... 137/484.8 |
| 2,239,116 | 4/1941 | Ray ................................ 137/484.8 |
| 2,358,819 | 9/1944 | Morris ............................ 137/484.8 |
| 3,120,856 | 2/1964 | McIntosh ....................... 137/505.36 |

Primary Examiner—Henry T. Klinksiek
Assistant Examiner—Robert J. Miller
Attorney—J. King Harness et al.

[57] ABSTRACT

A gas regulator has a diaphragm that is separated from the flow passage and valve chamber by a wall that has a plurality of pressure sensing passages in it which connect one side of the diaphragm with different points in the outlet passage.

6 Claims, 2 Drawing Figures

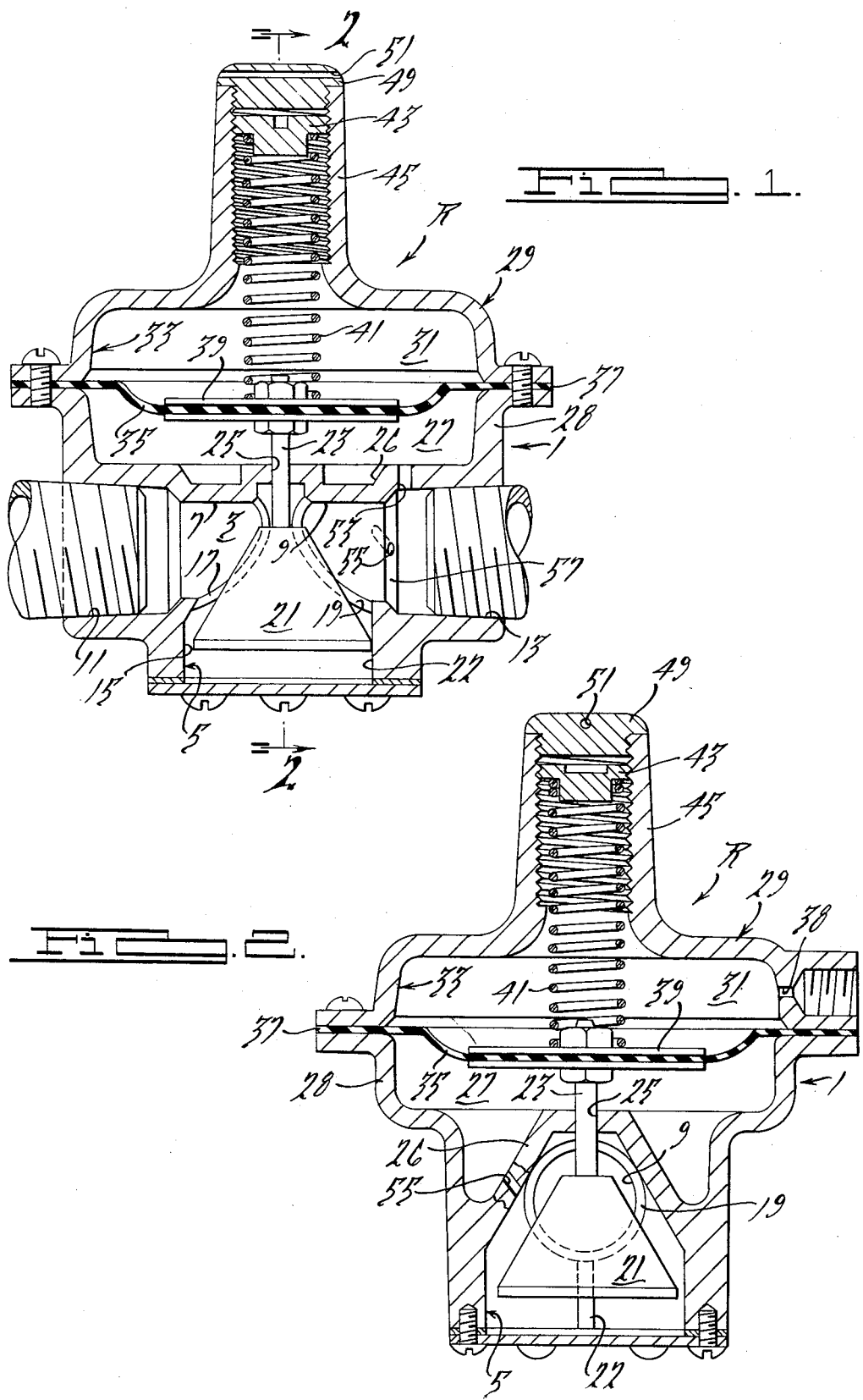

GAS REGULATOR

BACKGROUND OF THE INVENTION

In gas pressure regulators of the type with which the present invention is concerned, relatively low inlet gas pressures, in the order of about 2 or 3 inches water column to 23 or 24 inches water column, are controlled and it is desired, by means of the regulator, to maintain the outlet pressure constant in spite of substantial variations in inlet pressure or in rate of flow of gas through the regulator. The various characteristics of the structure of a gas regulator oppose this objective of maintaining a substantially constant outlet pressure. Among these are the spring effect, the diaphragm effect, the body effect, the valve effect, the effect of momentum forces, the dynamic pressure effect, and the effect of tilting of the regulator. Each of these, to a greater or lesser degree, interferes with the maintenance of a steady, constant, outlet pressure as the rate of flow through the regulator changes. In general, these effects result in a decrease in the outlet pressure as the rate of flow increases.

In gas regulators of the type described and claimed in Kern U.S. Pat. No. 2,668,396, most of these effects are minimized by the particular construction of the regulator which features a conical valve intersecting a straight through gas flow path. It has been found that the conical valve is substantially balanced and the regulator design permits use of a smaller diaphragm and shorter gas passage, all of which contribute to a flatter outlet pressure curve as compared with previous types of gas regulator wherein a poppet or globe type valve is used in conjunction with a diaphragm.

The present invention is based on the discovery that the range of operation over which a gas regulator of the Kern type, or probably other regulators of the type wherein the gas passage is separated from the diaphragm chamber, can be increased by a modification of the sensing hole means in the regulator.

BRIEF SUMMARY OF THE INVENTION

It is the basic purpose of this invention to improve the performance of a gas regulator, such as a regulator of the type of U.S. Pat. No. 2,668,396, so that it will maintain an acceptably constant outlet pressure over a larger range of varying inlet pressures and rates of through flow than was heretofore achieved.

The invention accomplishes this purpose by a modification of the means for sensing the pressure to which the diaphragm of the valve responds, and this modified sensing means includes a plurality of sensing passages, preferably two, which connect different specific points in the outlet passage of the regulator with the sensing chamber that is formed on one side by the diaphragm.

DESCRIPTION OF THE DRAWINGS

FIG. 1 is a vertical cross section through a midplane of a regulator embodying the invention showing the straight through gas flow passage; and FIG. 2 is a vertical cross section along a midplane that is perpendicular to the section of FIG. 1.

DESCRIPTION OF THE INVENTION

The invention is illustrated in connection with a gas regulator R of the type shown in the aforementioned Kern U.S. Pat. No. 2,668,396. It has a housing 1 with a straight through gas flow passage 3 extending horizontally through it. This passage is intersected at a central portion by a valve chamber 5 and thus may be regarded as divided into an inlet passage section 7 and an outlet passage section 9. These sections are preferably of uniform diameter and this is preferably the inside diameter of inlet and outlet pipes that are threaded into the enlarged and tapered pipe threaded portions 11 and 13 at the outlet ends of the passages 7 and 9.

The valve chamber 5 has a lower portion 15 and an upper portion which intersects passage 3. The valve seats 17 and 19 surround the openings of the sections 7 and 9 into the valve chamber 5 and are in the form of upraised lands shaped to fit the flow controlling valve member 21. As pointed out in more detail in U.S. Pat. No. 2,668,396, the valve 21 and the valve seats 17 and 19 are substantially conical and cooperation of the valve with the seats meters flow from passage 7 to passage 9 and regulates the pressure drop between the two passages so as to maintain a substantially constant pressure of a desired level in the outlet passage 9. The valve 21 is guided by a vertical runner or rib 22.

The valve 21 may be moved toward and away from the valve seats by any suitable motor means that is responsive to variations in pressure of the gas in the outlet passage 9, though preferably, this is a diaphragm type as will be presently described. Thus, the valve 21 has a coaxial stem 23 which extends through an aperture 25 in a wall 26 of the housing and into a pressure sensing cavity or chamber 27 defined on the bottom by the irregularly shaped wall 26 and on the side by the annular side wall 28 that extends up from the wall 26. A cover 29 for the housing 1 has a cavity 31 which mates with the cavity 27 to form a chamber 33 that receives the diaphragm member 35. The outer periphery of the diaphragm 35 is clamped in a fluid tight means between flanges on the cover and the housing as shown at 37, though air in the cavity 31 can be exhausted through a vent orifice 38.

The valve stem 23 is clamped to the diaphragm 35 to move with it by any suitable means such as the diaphragm plates and clamping nuts shown at 39. The diaphragm and valve assembly is yieldably biased to a valve open position by means of a coil spring 41 which is confined between the upper surface of the diaphragm 35 and an adjusting plug 43 that is threaded into the vertical tubular spring guide 45 that forms a distinctive part of the cover 29. A cap 49 is threaded into the top of the guide and is adapted by means of hole 51 to receive the standard sealing means that is employed to inhibit unauthorized compression of the spring 49.

In accordance with the present invention, two passages 53 and 55 extend through different parts of the wall 26 to connect the control pressure sensing chamber 27 with the outlet passage 9. In the preferred and illustrated embodiment, the opening 53 is located on a midplane in a top section of wall 26 as seen in FIG. 1 and in an angular sense is in the 12 o'clock position, i.e., it is at the top of the outlet passage 9. The sensing passage 55 is spaced angularly from the sensing passage 9 and is preferably located in a side section of wall 26 so that its center lies near but slightly above a horizontal plane through the longitudinal axis of the passage 3. In other words, the opening of the passage 55 into the outlet section 9 is preferably displaced in either direction through an angle of 90° from the passage 9. That is, as viewed in FIG. 2, the sensing passage 55 is in about the 9 o'clock position, or it could be in about the 3 o'clock position.

With respect to the axial location of the passages 53 and 55, the passage 53 is preferably located just downstream of the chamfer or transition section 57 between the large and small portions of outlet section 9, whereas the passage 55 preferably opens just over the inner end of the enlarged portion 13 of the passage 9, i.e., in the transition section 57. The location of the passage 53 corresponds to the sensing passage shown in U.S. Pat. No. 2,668,396 whereas the passage 55 is located substantially in accordance with a commercial regulator of the Kern design manufactured and sold by the assignee of this application.

It has been found that by using the two passages to sense the pressure in the outlet section 9 at the two different angularly spaced locations, a resultant pressure is obtained in the sensing chamber 27 that improves the performance of the regulator. Thus, relatively constant outlet pressures are obtained over a wider range of flow rates and inlet pressures than was obtained with a single sensing hole of either type. It has been found that the combination of two sensing holes flattens out the outlet pressure curve so that, for example, one regulator can meet current American National Standard Institute (ANSI) requirements for both class I and class II service.

In analyzing why the two sensing holes 53 and 55 give significantly better results than either hole used alone, the reason is believed to be that each senses a different pressure situation in the outlet section and probably tends to dominate the other during certain operating conditions. It appears that the hole 55 senses a lower pressure than the hole 53 and therefore tends to let the diaphragm open the valve more and boost or raise the outlet pressure. This is advantageous at low differential pressure operation and large valve opening as it tends to offset the various effects enumerated above which decrease the outlet pressure or cause a drop in the curve. The hole 53 appears to sense a higher pressure and therefore has little or no boosting effect and is advantageous at high differential pressures and when the valve is close to the seat. Thus, it appears that the hole 55 dominates at low inlet pressures and large openings and the hole 53 at high inlet pressures and small openings. The combined sensing of the two holes gives the desired result of a flat curve over a large range of flows and inlet pressures.

In broader application to other regulators having a flow path separated from the diaphragm or valve meter, the invention teaches the use of two or more sensing passages to sense two or more different pressure situations in the outlet section. One of the passages should be located to sense a pressure that is lower than average pressure in the outlet so as to tend to give a boost to the outlet pressure and offset the various other factors that tend, especially at low pressures, to cause a drop in the outlet pressure versus flow rate curve. The other sensing passage, if two are used, should be located to sense a higher pressure, preferably about the average in the outlet section.

Thus, the invention, in a broad sense, provides a gas pressure regulating device in which the position of the regulating valve depends upon a control pressure which is composed of pressures sensed at two or more points on the outlet side of the valve. These points are themselves separated and, at least under more severe operating conditions of moderate to high flow rates and differential pressures, are subject at a given instant to different pressure values, one of the points preferably being subject to a pressure below the average value for the outlet side. Modifications in the specific structure illustrated may be made without departing from the spirit and scope of the invention.

I claim:

1. In a gas pressure regulator for regulating the pressure of a gas stream flowing through it so that the pressure is substantially constant on the outlet side despite variations in pressure on the inlet side and in the rate of flow through the regulator, a housing having a diaphragm chamber with a vertical axis and a gas passage spaced from the chamber and located substantially along a horizontal line perpendicular to said chamber axis, said housing having a valve seat intersecting an intermediate portion of said passage and dividing it into an inlet section and an outlet section, a diaphragm operatively mounted in said chamber, a valve secured to the diaphragm for movement therewith along said chamber axis, said valve being located in said gas passage and cooperating with said valve seat to regulate the pressure in the outlet section, and means providing a plurality of sensing passages opening respectively at one end into different and substantially separated points of said outlet section and at the other end into said diaphragm chamber to expose one side of said diaphragm to the pressure in different points of said outlet section, said one side of said diaphragm being isolated from said passage except for communication with it through said sensing passages, said sensing passages being angularly displaced from each other by about 90°.

2. A regulator as set forth in claim 1 wherein one of said sensing passages is located in substantially the 12 o'clock position with respect to the midplane of the regulator.

3. In a gas pressure regulator for regulating the pressure of a gas stream flowing through it so that the pressure is substantially constant on the outlet side despite variations in pressure on the inlet side and in the rate of flow through the regulator, a housing having a diaphragm chamber with a vertical axis and a gas passage spaced from the chamber and located substantially along a horizontal line perpendicular to said chamber axis, said housing having a valve seat intersecting an intermediate portion of said passage and dividing it into an inlet section and an outlet section, a diaphragm operatively mounted in said chamber, a valve secured to the diaphragm for movement therewith along said chamber axis, said valve being located in said gas passage and cooperating with said valve seat to regulate the pressure in the outlet section, said valve and seat being substantially conical and the axis of the cone being substantially coaxial with the chamber axis, and means providing at least two sensing passages opening respectively at one end into different and substantially separated points of said outlet section and at the other end into said diaphragm chamber to expose one side of said diaphragm to the pressure in different points of said outlet section, each of said separated points being located transversely of said vertical axis a substantial distance downstream from said vertical axis, said one side of said diaphragm being isolated from said passage except for communication with it through said sensing passages.

4. A regulator as set forth in claim 3 wherein said housing includes a wall forming the bottom of the diaphragm chamber and an upper part of the gas passage and a substantially cylindrical section extending substantially at right angles to said vertical axis to form said outlet section, said sensing passages being formed in and extending through said wall into said cylindrical section.

5. In a gas pressure regulator for regulating the pressure of a gas stream flowing through it so that the pressure is substantially constant on the outlet side despite variations in pressure on the inlet side and in the rate of flow through the regulator, a housing having a diaphragm chamber with a vertical axis and a gas passage spaced from the chamber and located substantially along a horizontal line perpendicular to said chamber axis, said housing having a valve seat intersecting an intermediate portion of said passage and dividing it into an inlet section and an outlet section, a diaphragm operatively mounted in said chamber, a valve secured to the diaphragm for movement therewith along said chamber axis, said valve being located in said gas passage and cooperating with said valve seat to regulate the pressure in the outlet section, and means providing a plurality of sensing passages opening at one end respectively angularly different and substantially separated points of said outlet section and at the other end into said diaphragm chamber to expose one side of said diaphragm to the pressure in substantially different points of said outlet section, said one side of said diaphragm being isolated from said passage except for communication with it through said sensing passages.

6. In a gas pressure regulator, a housing having a gas flow passage in it, a valve chamber in said gas passage and dividing said passage into an inlet section and an outlet section, a valve in the valve chamber and movable along an axis perpendicular to said sections for controlling flow between said inlet and outlet sections, pressure responsive means for controlling axial movement of the valve so that the axial position of the valve is determined by pressure on the pressure responsive means, a pressure sensing chamber associated with the pressure responsive means and providing the control pressure on said pressure responsive means, said outlet section having a first pressure sensing point where the pressure is substantially average for the outlet section and a second pressure sensing point where the pressure is below average for the outlet section, both said pressure points being located substantially distances downstream from said axis, and passage means connecting said first and said second pressure sensing points respectively to said pressure sensing chamber so that the pressure at each said point is reflected in said chamber to form said control pressure.

* * * * *

UNITED STATES PATENT OFFICE
CERTIFICATE OF CORRECTION

Patent No. 3,773,071                    Dated November 20, 1973

Inventor(s)  Charles Stang, Jr.

It is certified that error appears in the above-identified patent and that said Letters Patent are hereby corrected as shown below:

Column 2, Last Line, (Appln. page 5, line 13), delete "in" (first occurrence) and insert -- from the position of --.

Figure 2 (amendment filed August 29, 1973) delete hole 55.

Signed and sealed this 31st day of December 1974.

(SEAL)
Attest:

McCOY M. GIBSON JR.                C. MARSHALL DANN
Attesting Officer                  Commissioner of Patents